United States Patent [19]

Foreman

[11] 4,047,574

[45] Sept. 13, 1977

[54] IMPLEMENT FOR LEVELLING LEVEES

[76] Inventor: Calvin I. Foreman, Rte. 1, Box 8, Iowa, La. 70647

[21] Appl. No.: 691,248

[22] Filed: June 1, 1976

[51] Int. Cl.² .................. A02B 13/02; A02B 35/02; F02F 5/08
[52] U.S. Cl. .................... 172/178; 172/180; 172/200
[58] Field of Search ............ 172/413, 178, 18 D, 172/199, 200, 733, 767, 770, 785, 71, 72

[56] References Cited

U.S. PATENT DOCUMENTS

| 512,276 | 1/1894 | Clark | 172/178 |
|---|---|---|---|
| 807,233 | 12/1905 | Atkinson | 172/178 |
| 2,611,196 | 9/1952 | Barrett | 172/178 |
| 2,787,105 | 4/1957 | Witwer | 172/413 |

FOREIGN PATENT DOCUMENTS

| 236,984 | 1/1959 | Australia | 172/181 |

Primary Examiner—Richard J. Johnson
Attorney, Agent, or Firm—Jack W. Hayden

[57] ABSTRACT

An implement to remove levees and the like from the earth's surface includes a frame means with longitudinal and lateral members connected to form a frame having sides, a front and a rear end. A pair of ganged disc harrows is supported on the frame and depends therefrom. Each of said pair of said ganged disc harrows extends inwardly from a side of the frame and towards the rear end of the frame to form a generally V-shape with the apex of the V-shape being disposed adjacent the center longitudinal axis of the frame. Dozer blade means comprised of a pair of dozer blades. Each of the dozer blades extend from a side of the frame and inwardly towards the front end of the frame to form a generally V-shape with the apex of the V formed by the dozer blades being disposed adjacent but rearwardly of the apex of the V formed by the ganged disc harrows. The dozer blades cooperate with the ganged disc harrows to level the earth as the implement is moved thereover. Adjustable wheel means support the frame means and means are mounted on the frame means to adjust the wheels to a desired elevation and to maintain such wheels in such desired elevation to thereby regulate the distance between the earth and the frame and to thus regulate the depth of cut as the implement moves over the terrain.

2 Claims, 4 Drawing Figures

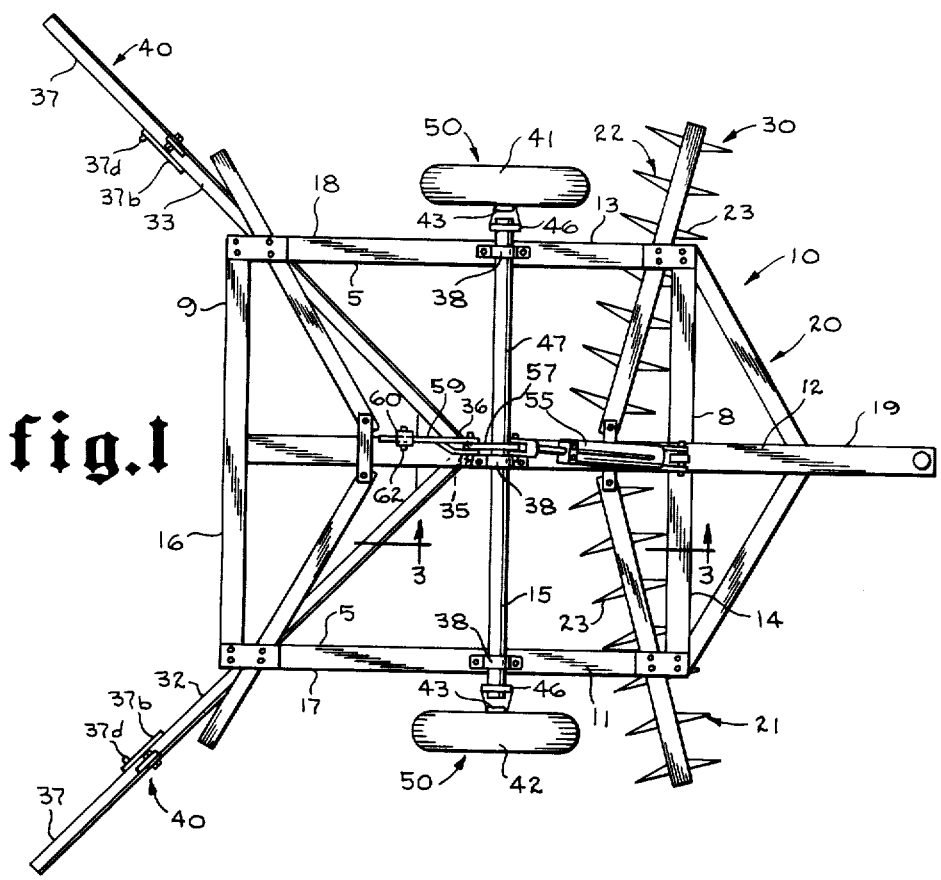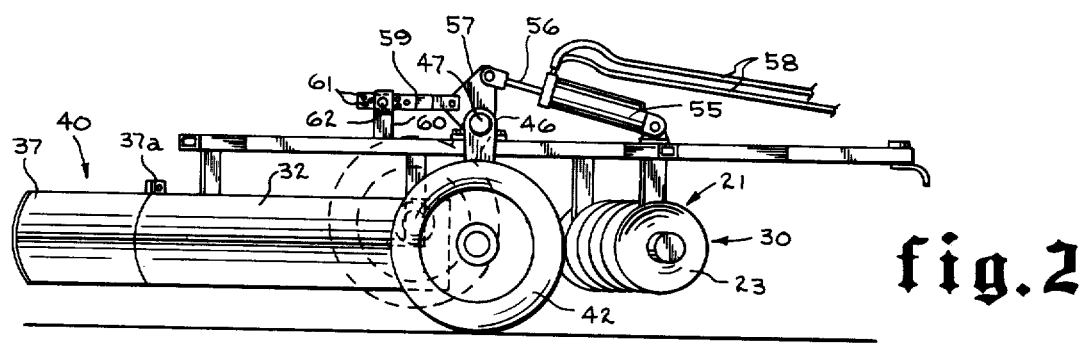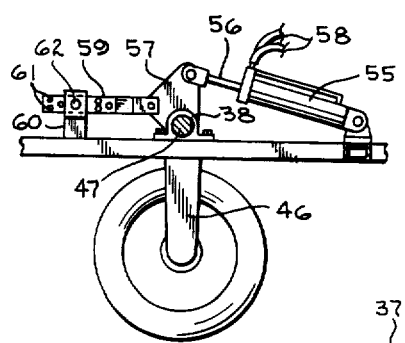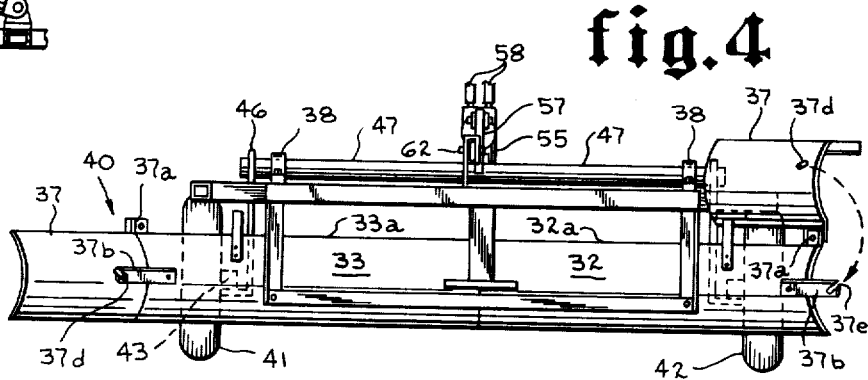

IMPLEMENT FOR LEVELLING LEVEES

SUMMARY OF THE INVENTION

Various types of vehicle or tractor drawn implements have been provided for working or tilling the earth's soil. However, in connection with growing various crops, such as by way of example, rice, it is necessary to construct levees which are used in irrigation to hold water on the earth's surface during growing of the rice. After the rice is harvested, it is desirable to tear down the levees and return the land to its former state so that it assumes the general contour of the earth's surface prior to building the levees.

The present invention is directed to an implement which presents advantages for the specific purpose of tearing down, dismantling, eradicating or doing away with obstructions on the earth's surface such as levees or the like.

Yet another object of the present invention is to provide an implement including a frame means supporting a pair of ganged disc harrows thereon to form a generally V-shape which faces towards the front end of the frame means and dozer blade means forming a generally V-shape which faces rearwardly with the apex of the V of the dozer blade means being positioned adjacent but spaced rearwardly of the V of the gaged disc harrow means and wheel means supporting the frame means to enable the frame means and supported ganged disc harrow means and dozer blade means to be moved over the earth's surface and engage levees and the like for levelling them.

Yet another object of the present invention is to provide an implement including a frame means supporting a pair of ganged disc harrows thereon to form a generally V-shape which faces towards the front end of the frame mean and dozer blade means forming a generally V-shape which faces rearwardly with the apex of the V of the dozer blade means being positioned adjacent but spaced rearwardly of the V of the ganged disc harrow means and wheel means supporting the frame means to enable the frame means and supported ganged disc harrow means and dozer blade means to be moved over the earth's surface and engage levees and the like for levelling them or tearing them down. The wheel means includes an arrangement so that such wheel means may be adjusted vertically relative to the frame to thereby position the frame in a predetermined elevated relationship relative to the earth so as to regulate the depth of the cut of the ganged disc harrow means and dozer blade means in the earth's surface as the implement moves thereover.

Yet another object of the present invention is to provide an implement including a frame means supporting a pair of ganged disc harrows thereon to form a generally V-shape which faces towards the front end of the frame means and dozer blade means forming a generally V-shape which faces rearwrdly with the apex of the V of the dozer blade means being positioned adjacent but spaced rearwardly of the V of the ganged disc harrow means and wheel means supporting the frame means to enable the frame means and supported ganged disc harrow means and dozer blade means to be moved over the earth's surface and engage levees and the like for levelling them or tearing them down. The wheel means includes an arrangement so that such wheel means may be adjusted vertically relative to the frame to thereby position the frame in a predetermined elevated relationship relative to the earth so as to regulate the depth of the cut of the ganged disc harrow means and dozer blade means in the earth's surface as the implement moves thereover. Means are provided for maintaining the wheels in any predetermined adjusted position.

Another object of the present invention is to provide a vehicle drawn implement which is constructed and arranged to withstand the rigors of levelling levees and the like in a field.

Yet a further object of the present invention is to provide a vehicle drawn implement which is sturdy and enables levees and the like in a field to be quickly torn down and levelled.

Other objects and advantages will become apparent from a consideration of the following description and drawings.

BRIEF DESCRIPTION OF THE DRAWINGS

FIG. 1 is a top plan view of the preferred embodiment of the present invention;

FIG. 2 is a right hand side view showing the wheels in one position in solid line and in another adjusted position in dotted line;

FIG. 3 is a sectional view which illustrates further structural details of the resent invention; and FIG. 4 is an enlarged detail view of the dozer blade arrangement.

BRIEF DESCRIPTION OF THE PREFERRED EMBODIMENT

In FIG. 1 the invention is referred to generally by the number 10 and is shown as including a frame means referred to generally at 20, ganged disc harrow means referred to generally at 30 and dozer blade means referred to at 40.

Adjustable wheel means referred to generally at 50 are provided for supporting the frame means 20 and regulating the depth of cut of the ganged disc harrow means 30 and dozer blade means 40 as will be described.

The frame means 20 includes spaced longitudinally extending members 11, 12 and 13, and while three of such longitudinally extending members are illustrated, it can be appreciated that any suitable number may be employed. A plurality of laterally extending members 14, 15 and 16 are secured to the longitudinally extending members to form a frame 5 which extends generally horizontal relative to the earth's surface and thus provides sides 17 and 18 on the frame as well as a front end 8 and a rear end 9. The longitudinally extending member 12 extends beyond the front or forward end 8 to provide a tow bar 19 so that the implement referred to generally at 10 may be secured with a vehicle for moving it over the earth's terrain. The ganged disc harrow means 30 includes a pair of ganged disc harrows each of which is secured to and supported by the frame 5 and depends therefrom. The ganged disc harrows 21 and 22 include a plurality of discs 23 whose construction and arrangement are well known in the art. It will be noted that the ganged disc harrows 21 and 22 extend respectively from the sides 17 and 18 of the frame 5 and extend inwardly and rearwardly towards the rear end 9 of the frame 5.

The innermost ends of the ganged disc harrows 21, 22 terminate in suitably spaced relationship to enable the innermost discs 23 arranged thereon to operate without interference, but the arrangement of the ganged disc harrows 21, 22 generally form a Vee shape configuration with the apex of the Vee referred to at 25 being disposed adjacent the center longitudinal axis of the frame 5 as illustrated in the drawings.

The dozer blade means referred to at 40 includes a pair of dozer blades 32 and 33 which extend in a generally vertical plane in relation to the frame 5. The dozer blades 32 and 33 are also secured to and supported by the frame 5 and depend downwardly therefrom. Also, the dozer blade 32 and dozer blade 33 extend from the sides 17 and 18 respectively and inwardly toward the front end 8 of frame 5 to form a generally Vee shape with the apex 35 of the Vee being disposed in alignment with the apex 25 of the ganged disc harrows 21 and 22. The apex 35 is spaced behind the rearward most edge of the apex 25 of the ganged disc harrows. The innermost vertical end 36 of the dozer blades 32 and 33 are joined so that the dozer blades 32, 33 present a continuous surface for engagement with the earth in a manner as will be described.

The adjustable wheel means 50 includes a wheel 41 and 42 each of which is rotatably mounted on an axle 43.

The wheel means 50 also includes an arrangement for adjustably supporting the wheels relative to the frame 5 so that the distance of the frame 5 relative to the earth over which it is moving may be varied. Members 46 are secured to each of the axles 43 of the wheels 41 and 42 and extends upwardly therefrom at each side of the frame 5. The members 46 are connected at their upper ends to the member 47 which extends across the frame 5 as illustrated in FIG. 1. Suitable means such as the supports 38 are provided to enable the shaft 47 to freely rotate.

The adjustable wheel means 50 also includes the hydraulic cylinder 55 mounted on and extending generally along the central longitudinally extending member 12 as illustrated in the drawings adjacent the forward end thereof. The piston rod 56 projecting therefrom is connected to the rocker arm 57 which is mounted on the shaft 47. The hydraulic cylinder 55 is of the double acting type and of course is provided with a piston therein which is secured to the piston rod 56 so as to either retract the piston rod 56 into the hydraulic cylinder 55 or extend it therefrom in response to fluid flow to the hydraulic cylinder 55. As viewed in the drawings, it can be appreciated that when hydraulic fluid is supplied through the hoses illustrated at 58 so that fluid is discharge into the hydraulic cylinder 55 to act on the piston rod 56 and move it inwardly, the rocker arm means 57 is moved by piston rod 56 to rotate shaft means 47 thus causing wheels 41, 42 to move upwardly towards the frame 5. This lowers the frame 5 and in turn increases the depth of cut of the disc harrow blades 23 and the dozer blades 32, 33 in the terrain over which the implement 10 is being moved.

Conversely, when the hose means 58 supplies fluid to the opposite end of the hydraulic cylinder so as to extend the piston rod 56 therefrom the rocker arm 57 and shaft means 47 are rotated so that the wheels 41, 42 are moved downwardly away from the generally horizontally extending frame 5 to thus elevate the frame 5 and the ganged disc harrows 21 and 22 as well as the dozer blade means 40 supported thereby. If desired the adjustable wheel means 50 can be moved to and retained in a position so as to completely elevate the ganged disc harrows 21, 22 and dozer blade means 40 relative to the frame 5 for transport or movement of the implement 10 over a highway or the like.

The outermost end of each of the dozer blades 32 and 33 includes a portion 37 which is pivotally mounted adjacent its upper edge 37a to the adjacent upper edge 32a, 33a of the dozer blades 32, 33.

This enables the portions 37 to be pivotally moved upwardly so as to rest on top of the dozer blades 32, 33 to further facilitate movement of the implement of the present invention.

In use, the portions 37 will be pivoted downward in the position illustrated in FIG. 4 of the drawings and backup or reinforcing member 37b is secured by any suitable means such as welding or the like to the back of each of the blades 32, 33 and extends beyond the outermost end of the blades 32, 33 so that when the portions 37 are pivoted downwardly, they are engaged against the plates 37b and thereby retained in alignment with the balance of the blades 32, 33 as the implement is moved over the terrain. The reinforcing member 37b is provided with slot means 37e for receiving lug or projection 37d on the back of portions 37 to further aid in securing portions 37 in position when in use.

The implement 10 of the present invention may be secured to any type vehicle, such as a tractor or the like by means of the two bar 19 and moved over the earth's surface. As previously noted the adjustable wheel means 50 may be moved to so as to position the frame 5 at a desired elevation in relation to the earth over which it is moving and thus will regulate the depth of the cut of the ganged disc harrows 21, 22 and dozer blade means 40 with the levees in the field in which the present invention is to be employed.

In order to maintain the adjustable wheel means 50 in any desired position engaging means 59 is connected to the rocker arm 57 and extend longitudinally of the frame and extend therefrom as illustrated in the drawings. Suitable bracket means 60 are mounted on the frame 5 and as illustrated on the longitudinally extending member 12, such bracket means is adapted to receive the engaging means 59 therein. The engaging means 59 includes a plurality of holes 61 at longitudinally and laterally spaced intervals, and a bolt 62 or the like may be extended through the bracket means 60 and one of the openings 61 aligned therewith to thereby retain the rocker arm 57 and shaft means 47 in a predetermined rotated position to maintain a predetermined position of the wheels 41, 42 thus relieving the load on the hydraulic cylinder 55.

In use of the present invention the adjustable wheel means 50 may first be positioned relative to frame 5 to regulate the contact of ganged disc harrows 21, 22 and dozer blade means 40. It can be appreciated that as the implement 10 is then moved over the earth's terrain, the disc harrows 21, 22 will initially contact the levees and tend to loosen the soil forming levees and then the dozer blades 32, 33 engage the loosened soil and moves it outwardly and laterally relative to the frame 5 to spread it. Movement of the implement 10 over the field may be repeated until the leavees are eliminated and the soil therefrom spread so as to return the field to its original contour prior to forming the levees.

The foregoing disclosure and description of the invention are illustrative and explanatory thereof, and various changes in the size, shape, and materials as well as in the details of the illustrated construction may be made without departing from the spirit of the invention.

What is claimed is:

1. An implement for levelling levees and the like to the general contour of the earth's terrain comprising:

a. frame means;
b. said frame means including:
 1. longitudinally extending, spaced members;
 2. spaced lateral members extending between and connected to said longitudinally extending members to form a frame having spaced sides, a front and rear end;
 3. tow bar means projecting from said front end of said frame; and
c. a pair of ganged disc harrows supported by said frame means and depending downwardly therefrom;
d. each of said pair of ganged disc harrows extending inwardly from a side of said frame and towards the rear end of the frame to form a generally V shape with the apex of the V shape being disposed adjacent the center longitudinal axis of said frame;
e. dozer blade means supported by said frame means and depending therefrom;
f. said dozer blade means comprising a pair of dozer blades each of which extends from a side of said frame and inwardly towards the front end of the frame to form generally a V shape with the apex of the V being disposed adjacent but rearwardly of the apex of the V formed by said ganged disc harrows;
g. adjustable wheels means supporting said frame;
h. means to adjust said wheel means to raise and lower said frame relative to the terrain to thereby regulate the contact of said ganged disc harrows and dozer blade means with the earth; and
i. said dozer blades each including an end portion which is pivotally mounted thereon whereby such end portion may be moved up on top of the balance of said dozer blade to reduce the width of the dozer blade.

2. The invention of claim 1 wherein said adjustable wheel means is disposed on each side of said frame and between said ganged disc harrows and said dozer blade means, said adjustable wheel means including:
 a. means for pivotally mounting said wheel means on each side of said frame;
 b. rocker arm means secured to said pivotal mounting means;
 c. hydraulically actuated means mounted on said frame and connected to said rocker arm means to rotate said pivotal mounting and thereby raise and lower said wheel means;
 d. engaging means engaging said rocker arm and extending therefrom; and
 e. means mounted on said frame for connecting with said engaging means to retain said rocker arm and said pivotal means in a predetermined position to which they are moved by said hydraulically actuated means.

* * * * *